United States Patent [19]

Saito et al.

[11] Patent Number: 4,599,663
[45] Date of Patent: Jul. 8, 1986

[54] RECORDING APPARATUS WITH STABLE DISC SUPPORT AND HIGH MAGNETIC FLUX HOLD-DOWN

[75] Inventors: Etsuro Saito, Ayase; Shinichiro Takahashi, Tokyo; Masami Yuasa, Chofu; Tsutomu Akiyama, Tokyo, all of Japan

[73] Assignee: Sony Corporation, Tokyo, Japan

[21] Appl. No.: 537,989

[22] Filed: Oct. 3, 1983

[30] Foreign Application Priority Data

Oct. 29, 1982 [JP] Japan .................. 57-164078[U]

[51] Int. Cl.$^4$ .................. G11B 5/012; G11B 23/00
[52] U.S. Cl. .................. 360/97; 369/271; 360/135
[58] Field of Search .......... 360/131, 132, 133, 97, 360/98, 99, 86; 369/270, 271

[56] References Cited

U.S. PATENT DOCUMENTS

| | | |
|---|---|---|
| 3,615,070 | 10/1971 | Charlton . |
| 3,706,085 | 12/1972 | Mowrey et al. . |
| 3,815,146 | 6/1974 | Nash . |
| 3,864,748 | 2/1975 | Herdman et al. .................. 360/133 |
| 3,917,068 | 11/1975 | Cheney .................. 360/133 |
| 3,980,308 | 9/1976 | Camerik et al. . |
| 4,040,634 | 8/1977 | Leedom . |
| 4,224,648 | 9/1980 | Roling . |
| 4,232,870 | 11/1980 | Iemenschot . |
| 4,351,047 | 9/1982 | Redlich et al. .................. 369/270 |
| 4,378,576 | 3/1983 | Roling .................. 360/97 |
| 4,387,454 | 6/1983 | Yamamura et al. .................. 369/270 |

FOREIGN PATENT DOCUMENTS

| | | |
|---|---|---|
| 2443593 | 9/1974 | Fed. Rep. of Germany . |
| 1380469 | 4/1972 | United Kingdom . |
| 1406254 | 8/1972 | United Kingdom . |
| 1538568 | 3/1976 | United Kingdom . |

OTHER PUBLICATIONS

J. L. Beck, C. A. Larson, G. J. O'Konski and D. R. Wilson, Hub Assembly for Flexible Disk Media, May 1977.

*Primary Examiner*—John H. Wolff
*Assistant Examiner*—Andrew L. Sniezek
*Attorney, Agent, or Firm*—Lewis H. Eslinger; Alvin Sinderbrand

[57] ABSTRACT

A magnetic recording apparatus includes a rotary disc rotatable about an axis and having an outwardly extending radial flange with three apertures therein; three pins mounted in the apertures on the rotary disc and positioned about a circle concentric with the axis for accurately supporting an information record disc thereon, each of the three pins projecting from the rotary disc to substantially the same height; and a magnet positioned on the flange of the rotary disc and having a height lower than the three pins for magnetically attracting the information record disc to secure the latter on the three pins.

7 Claims, 5 Drawing Figures

RECORDING APPARATUS WITH STABLE DISC SUPPORT AND HIGH MAGNETIC FLUX HOLD-DOWN

BACKGROUND OF THE INVENTION

1. Field of the Invention

This invention relates generally to a magnetic recording apparatus and, more particularly, is directed to a rotary disc of a magnetic recording apparatus on which an information record disc is mounted.

2. Description of the Prior Art

An information record disc has previously been used for recording video information signals in magnetic recording apparatus, such as a video camera, in a plurality, for example, twenty-five, spiral tracks thereon, with one field of video signals being recorded in each track and one field of a still-picture being reproduced by scanning each track. Generally, the information record disc includes a central core and a yoke made of a magnetic material secured at the underside of the central core, the yoke including a projection which extends to a position at the upper surface of the central core.

The magnetic recording apparatus includes a rotary disc mounted on a rotatable shaft and which supports and positions the information record disc in the apparatus. More particularly, the rotary disc includes an outwardly extending radial flange on which an annular magnet is positioned for magnetically attracting the information record disc and, more particularly, the yoke thereof. An annular support member is also positioned on the outwardly extending radial flange of the rotary disc in surrounding relation to the magnet. The support member is also made of a magnetic material and extends to a height above the magnet so as to provide a circular support surface upon which the information record disc and, more particularly, the yoke thereof, rests. At such time, the yoke is held firmly with the annular support member by magnetic attraction from the magnet so as to securely position the information record disc in the magnetic recording apparatus. In addition, a magnetic flux detector of the magnetic recording apparatus is provided which is positioned once during each revolution of the information record disc in opposing relation to the projecton of the yoke which extends to the upper surface of the information record disc, for example, for determining the speed and/or phase of rotation of the information record disc.

However, with the magnetic recording apparatus according to the prior art, because the information record disc is supported on the annular support member at a higher position than the magnet of the magnetic recording apparatus, a high output magnetic flux at the projection of the yoke at the upper surface of the information record disc is difficult to obtain. Accordingly, only a small leakage flux is obtained thereat for detection by the magnetic flux detector. Another problem with the magnetic recording apparatus according to the prior art is that the contact between the yoke and the upper surface of the annular support member may not be flush. In other words, because both contact surfaces thereof are circular, any irregularities or deformaties in the flatness of the surfaces will cause poor contact therebetween. In addition, magnetic powder or the like may be attracted on the upper surface of the annular support member, thereby resulting in further irregularities in the surfaces so as to further decrease the stability of contact between the two surfaces.

OBJECTS AND SUMMARY OF THE INVENTION

Accordingly, it is an object of this invention to provide a magnetic recording apparatus that avoids the above-described difficulties encountered with the prior art.

More particulary, it is an object of this invention to provide a magnetic recording apparatus which provides a stable support for the information record disc positioned therein.

It is another object of this invention to provide a magnetic recording apparatus which provides a high output magnetic flux from an information record disc positioned therein.

In accordance with an aspect of the present invention, a magnetic recording apparatus includes rotary disc means rotatable about an axis; at least three pins mounted on said rotary disc means and positioned about a circle concentric with said axis for accurately supporting an information record disc thereon, each of said at least three pins projecting from said rotary disc means to substantially the same height; and magnet means positioned on said rotary disc means and having a height lower than said at least three pins for magnetically attracting said information record disc to secure the latter on said at least three pins.

The above, and other, objects, features and advantages of the present invention, will become apparent from the following detailed description thereof which is to be read in connection with the accompanying drawings.

DETAILED DESCRIPTION OF THE PREFERRED EMBODIMENTS

Figure 1:
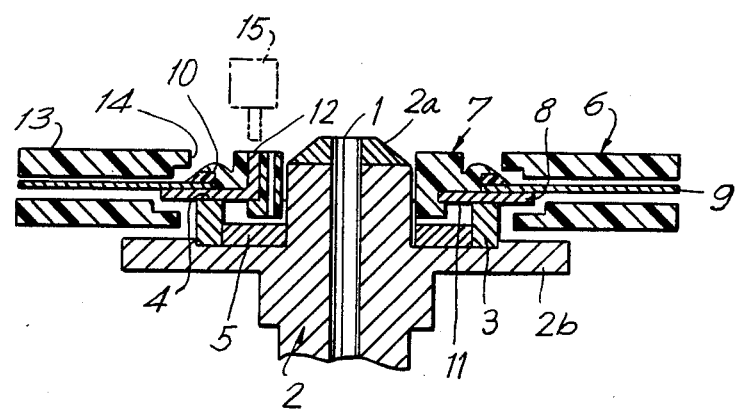
FIG. 1 is a schematic cross-sectional view of a portion of a magnetic recording apparatus according to the prior art, with an information record disc positioned therein.

Referring to the drawings in detail, and initially to FIG. 1 thereof, a magnetic recording apparatus according to the prior art includes a rotary disc 2 mounted on a rotatable shaft 1 for rotation therewith by means of, for example, a motor. More particularly, rotary disc 2 is made of a magnetic material and includes a hub 2a centrally mounted on rotatable shaft 1 and an outwardly extending radial flange 2b for supporting an information record disc 6, which may be of the type described in copending U.S. patent application Ser. No. 534,066, filed 9-20-83, having a common assignee herewith, and the disclosure of which is incorporated herein by reference. An annular magnet 5 is positioned on the upper surface of flange 2b surrounding hub 2a of rotary disc 2 for magnetically attracting information record disc 6 thereto, and an annular support member 3 which is made of a magnetic material, is also supported on flange 2b in surrounding relation to magnet 5. In accordance with the prior art apparatus of FIG. 1, support member 3 extends to a height higher than the upper surface of magnet 5 and thereby provides a circular support surface 4 which supports information record disc 6.

As shown in FIG. 1, information record disc 6 includes a substantially cylindrical central core 7 made of plastic, resin or the like, a flat, circular yoke 8 of a magnetic metal secured to central core 7 and which includes a flange extending radially outward from central core 7 and which thereby provides an upper surface on which a magnetic disc 9 for recording the information is secured. More particularly, magnetic disc 9 is sandwiched between the upper surface of yoke 8 and central core 7, that is, an annular elastic member 10 fixes magnetic disc 9 between yoke 8 and central core 7.

It is to be appreciated that the undersurface 11 of yoke 8 forms a circular reference surface which rests upon the upper support surface 4 of support element 3 for supporting the information record disc. In this regard, information record disc 6 includes a cassette housing 13 formed with a central opening 14 at which the undersurface 11 of yoke 8 is exposed, whereby the latter rests upon upper surface 4 of support member 3. Thus, with the prior art apparatus of FIG. 1, magnet 5 magnetically attracts yoke 8 in the downward direction of FIG. 1, so that undersurface 11 of yoke 8 is supported and thereby secured to the upper surface 4 of support member 3. However, with the prior art apparatus of FIG. 1, the contact between yoke 8 and support member 3 is not a good contact. In particular, various deformaties and irregularities in undersurface 11 and support surface 4 result in undersurface 11 and support surface 4 not being flush throughout the entire circular area of support surface 4. This, of course, provides a somewhat unstable support surface for information record disc 6. Further, with such arrangement, magnetic powder is likely to be attracted on support surface 4, thereby resulting in further irregularities in the flatness of the surface, and thereby further decreasing the stability of the support.

In addition, with information record disc 6 of FIG. 1, yoke 8 extends upwardly through central core 7 to form a projection 12 which projects to and is exposed at the upper surface of information record disc 6 and is substantially parallel to the axis of shaft 1. A magnetic flux detector 15 is provided above central core 7 so that for each revolution of information record disc 6, magnetic flux detector 15 is positioned in opposing relation with the upper surface of projection 12, for example, for determining the speed and/or phase of magnetic disc 9 therein. However, because information record disc 6 is supported by support member 3 so that magnet 5 is-spaced from the upper surface of projection 12, whereby lines of magnetic force are provided through circular support member 3 and yoke 8 to projection 12, it becomes difficult to obtain a high output magnetic flux from projection 12. Accordingly, only a small leakage flux is obtained from magnet 5 at projection 12 for detection by magnetic flux detector 15.

Figure 2:
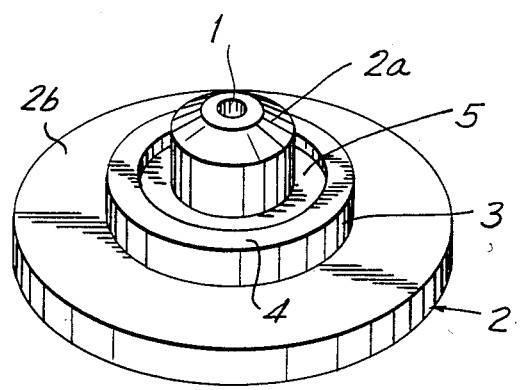
FIG. 2 is a perspective view of the portion of the magnetic recording apparatus of FIG. 1.
Figure 3:
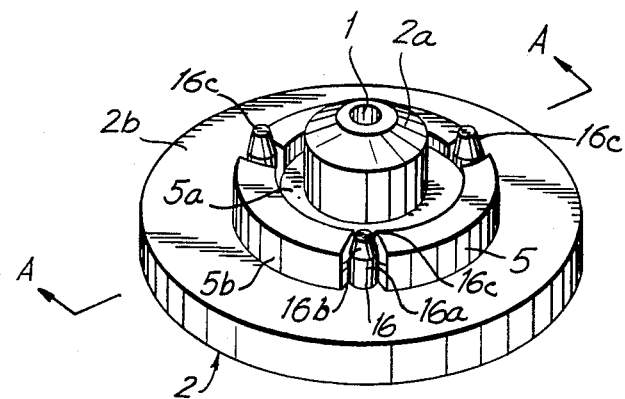
FIG. 3 is a perspective view of a portion of a magnetic recording apparatus according to one embodiment of the present invention.
Figure 4:
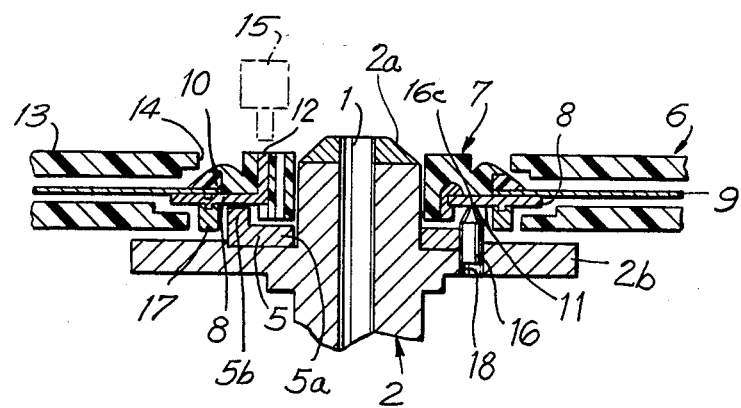
FIG. 4 is a schematic cross-sectional view of the portion of the magnetic recording apparatus of FIG. 3, taken along line A—A thereof.
Figure 5:
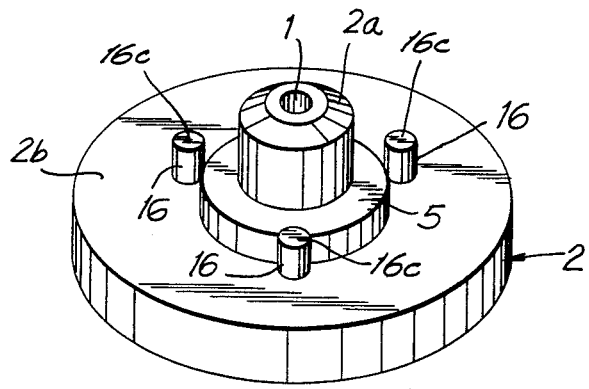
FIG. 5 is a perspective view of a portion of a magnetic recording apparatus according to another embodiment of the present invention.

Referring now to FIGS. 3 and 4, a magnetic recording apparatus according to one embodiment of the present invention will now be described, in which elements corresponding to those previously described in regard to the prior art apparatus of FIG. 1 are identified by the same reference numerals, and a detailed description thereof will be omitted herein for the sake of brevity. As shown therein, the apparatus of FIG. 3 is formed with a rotary disc 2 substantially identical to that of FIG. 1 and which is mounted for rotational movement on a rotatable shaft 1. Rotary disc 2 may be formed of a magnetic or non-magnetic material. In accordance with the present invention, support member 3 according to the prior art of FIGS. 1 and 2 is replaced by at least three pins 16 of a non-magnetic material and which are arranged along a circular path on the upper surface of flange 2b, and are spaced apart by equal angles. Preferably, three pins are provided which are the minimum number of pins necessary to define a planar surface. Further, as shown in FIG. 3, each pin may be formed of a cylindrical lower section 16a, followed by an upper frusto-conical section 16b which has a relatively flat support surface 16c at the upper end thereof. It is to be appreciated that the upper surfaces 16c of the three pins 16 are extremely small compared with the entire circular support surface 4 according to the prior art of FIG. 1, and accordingly, any irregularities or deformaties therein will not affect to any great extent the planar support surface that is defined by the three pins. It is to be appreciated that, although pins 16 are shown with the configuration aforementioned, any other suitable configuration may be utilized. For example, each pin 16 may be formed as a cylindrical configuration with a hemispherical upper end so that effectively a support point, rather than a support surface, is formed for each pin. Alternatively, pins 16 may be formed as cylinders as shown in FIG. 5. As shown in FIG. 4, pins 16 are fit within apertures 18 of flange 2b from which they project, and accordingly, the height of each pin 16 can be adjusted to determine the support surface for the information record disc, even after other elements of the magnetic recording apparatus are assembled. Further, because annular support member 3 according to the prior art is eliminated, a cover 17 in the form of a downwardly extending skirt is provided at the underside of yoke 8 to prevent dirt and the like from entering the apparatus.

As with the prior art apparatus of FIG. 1, a magnet 5 is formed on the upper surface of flange 2b for attracting yoke 8 of the information record disc so that the latter firmly sits upon upper surfaces 16c of pins 16. In accordance with another aspect of the present invention, magnet 5 includes an annular portion 5a which is mounted upon the upper surface of flange 2b in surrounding relation to hub 2a, and an upwardly extending or raised portion 5b which is concentric with the circumference defined by pins 16 but which has a slightly lower height than pins 16. In this manner, the upper surface of portion 5b of magnet 5 does not form a support surface for information record disc 6. It is to be appreciated, however, that the upper surface of portion 5b of magnet 5 is of only a slightly smaller height than support surface 16c of each pin 16. In this regard, since the magnetic flux travels directly from the upper surface of portion 5b of magnet 5 through yoke 8 to the upper surface of projection 12 thereof, a high output magnetic flux is obtained from projection 12 as a result of magnet 5 directly opposing yoke 8 and, more particularly, projection 12 thereof. It is to be appreciated that a magnetic support member 3 is not necessary to provide the magnetic flux from magner 5 to projection 12, and further since magnet 5 is spaced inwardly from the position of support member 3 in FIG. 1, magnet 5 is closer to projection 12 to provide a high output magnetic flux at projection 12. It is to be appreciated that, although magnet 5 is shown in FIGS. 3 and 4 as being within the circumference defined by pins 16, any other suitable configuration of magnet 5 may be provided. For example, magnet 5 may be comprised of portion 5*b* thereof, as shown in FIGS. 3 and 4, and an outer annular portion may be provided outside the circumference defined by pins 16 rather than inner annular portion 5*a* shown in FIGS. 3 and 4.

It is to be appreciated that the essential aspect of the present invention is the provision of pins 16 in place of annular support member 3 according to the prior art. Thus, for example, outer portion 5*b* of magnet 5 shown in FIG. 3 forms a secondary aspect of the present invention and may be eliminated, as shown in FIG. 5 herein.

Having described specific preferred embodiments of the invention with reference to the accompanying drawings, it is to be understood that the present invention is not limited to those specific embodiments, and that various changes and modifications may be effected therein by one skilled in the art within the scope and spirit of the invention as defined by the appended claims.

What is claimed is:

1. A magnetic recording apparatus comprising: rotary disc means rotatable about an axis; magnet means positioned on said rotary disc means; and at least three pins mounted on said rotary disc means for rotation therewith and positioned about a circle concentric with said axis for supporting an information record disc thereon, each of said at least three pins projecting from said rotary disc means to substantially the same height relative thereto; and said magnet means having a height lower than said at least three pins relative to said rotary disc means for magnetically attracting an information record disc to secure the latter on said at least three pins so that said at least three pins acurately and exclusively support said information record disc on said rotary disc means.

2. A magnetic recording apparatus according to claim 1; in which only three pins are mounted on said rotary disc means and positioned about said circle.

3. A magnetic recording apparatus according to claim 1; in which each pin has a lower cylindrical configuration and an upper frusto-conical configuration.

4. A magnetic recording apparatus according to claim 1; in which each of said pins has a cylindrical configuration.

5. A magnetic recording apparatus according to claim 1; in which said pins are spaced from each other about said circle concentric with said axis by substantially equal angles.

6. A magnetic recording apparatus according to claim 1; in which said magnet means has a raised portion which extends to a height only slightly lower relative to said rotary disc means than the height of said at least three pins.

7. A magnetic recording apparatus according to claim 1; in which said rotary disc means includes flange means having a plurality of apertures therein; and each of said pins is slidably mounted in a respective one of said apertures and can be positioned therein to adjust the height thereof relative to said rotary disc means.

* * * * *